United States Patent [19]
Aines et al.

[11] Patent Number: 6,142,706
[45] Date of Patent: Nov. 7, 2000

[54] THERMAL TREATMENT WALL

[75] Inventors: Roger D. Aines; Robin L. Newmark; Kevin G. Knauss, all of Livermore, Calif.

[73] Assignee: The Regents of the University of California, Oakland, Calif.

[21] Appl. No.: 09/078,376

[22] Filed: May 13, 1998

[51] Int. Cl.[7] .............................. E02D 19/14; B09B 1/00
[52] U.S. Cl. ..................... 405/131; 405/128; 588/252
[58] Field of Search .................................. 405/128, 131, 405/129, 258; 588/252

[56] References Cited

U.S. PATENT DOCUMENTS

| | | | |
|---|---|---|---|
| 5,018,576 | 5/1991 | Udell et al. | 405/131 X |
| 5,024,556 | 6/1991 | Timmerman | 405/128 |
| 5,249,888 | 10/1993 | Braithwaite et al. | 405/131 X |
| 5,271,693 | 12/1993 | Johnson et al. | 405/131 X |
| 5,316,411 | 5/1994 | Buelt et al. | 405/131 X |
| 5,318,116 | 6/1994 | Vinegar et al. | 405/128 X |
| 5,330,291 | 7/1994 | Heath et al. | 405/128 |
| 5,360,067 | 11/1994 | Meo | 405/128 X |
| 5,370,477 | 12/1994 | Bunin et al. | 405/131 X |
| 5,449,251 | 9/1995 | Daily et al. | 405/131 X |
| 5,476,992 | 12/1995 | Ho et al. | 405/131 X |
| 5,482,402 | 1/1996 | Nelson | 405/131 X |
| 5,660,500 | 8/1997 | Marsden et al. | 405/141 X |
| 5,681,130 | 10/1997 | Aines et al. | 405/131 X |
| 5,730,550 | 3/1998 | Andersland et al. | 405/128 |
| 5,813,799 | 9/1998 | Calcote et al. | 405/131 X |
| 5,868,941 | 2/1999 | Gillham et al. | 405/128 X |

FOREIGN PATENT DOCUMENTS

WO 97/10030  3/1997  WIPO.

*Primary Examiner*—Dennis L. Taylor
*Attorney, Agent, or Firm*—L. E. Carnahan; Alan H. Thompson; Daryl S. Grzybicki

[57] ABSTRACT

A thermal treatment wall emplaced to perform in-situ destruction of contaminants in groundwater. Thermal destruction of specific contaminants occurs by hydrous pyrolysis/oxidation at temperatures achievable by existing thermal remediation techniques (electrical heating or steam injection) in the presence of oxygen or soil mineral oxidants, such as $MnO_2$. The thermal treatment wall can be installed in a variety of configurations depending on the specific objectives, and can be used for groundwater cleanup, wherein in-situ destruction of contaminants is carried out rather than extracting contaminated fluids to the surface, where they are to be cleaned. In addition, the thermal treatment wall can be used for both plume interdiction and near-wellhead in-situ groundwater treatment. Thus, this technique can be utilized for a variety of groundwater contamination problems.

22 Claims, 3 Drawing Sheets

THERMAL TREATMENT WALL

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to groundwater cleanup, particularly to the destruction of groundwater contaminants by thermal hydrous, pyrolysis/oxidation, and more particular to a thermal treatment wall emplaced to perform in-situ destruction of contaminants in groundwater.

In recent years substantial effort has been directed to the cleanup of underground contamination, particularly groundwater contamination. Various remediation methods have been developed, primarily thermal type remediation techniques wherein heating of the contaminated groundwater, for example, was carried out by electrical heating or by cyclic steam injection to produce an engineered treatment zone. These early efforts primarily involved a pump and treat technology, wherein the contaminated matter was pumped to the surface and then treated. More recently, the development of the microbial filter extended the concept of an engineered treatment zone in the subsurface. Recent efforts also involved the destruction of contaminants by thermal hydrous pyrolysis/oxidation. Also, prior efforts have been directed to the treatment wall concept, and efforts at the Lawrence Livermore National Laboratory have been focused on understanding the key parameters which optimize destruction in the reaction zone, which provides the framework for the present invention involving a thermal treatment wall.

The present invention is a derivative of the prior techniques and provides a thermal treatment wall which incorporates known heating techniques (either electrical or cyclic steam injection), the treatment wall concept, and in-situ destruction of contaminants by thermal hydrous pyrolysis/oxidation. By the combining of these three prior techniques, many common chemical contaminants can be destroyed in-situ by increasing the temperature in the presence of sufficient oxygen or mineral oxidants, which can be injected into the ground if needed.

The present invention initially involved the concept of applying in-situ thermal enhancement in a thermal wall configuration as a plume interdiction method. The initial concept was a planar thermal treatment wall similar in structure to a microbial filter, but utilizing various heating methods including electric resistance heating and steam injection. This initial planar wall concept was expanded to include a thermal treatment zone(s) surrounding pumping well(s). Thus, the invention can be used for both plume interdiction and near-wellhead in-situ groundwater treatment.

In-situ treatment, as used in the present, is a significant step beyond the commonly-used pump and treat technology. Pump and treat systems are primarily used for hydrologic containment of underground contamination, rather than as a contaminant removal method. Since pumping contaminated groundwater rarely removes much contaminant mass (due to the solubility limits of the contaminants in water and their entrapment by capillary forces or by sorption on soil particles), it requires the treatment of many pore volumes of groundwater to clean as aquifer. Once the contaminated fluids are pumped to the surface, treatment and disposal (of both the contaminants and the treated water) are required. There is significant expense in the handling, treatment and disposal of the pumped fluids. With the development of in-situ contaminant destruction techniques, costly ex-situ treatment is not needed.

Thus, the present invention, a thermal treatment wall, can be emplaced to perform in-situ destruction of contaminants in groundwater. Thermal destruction of specific contaminants occurs by hydrous pyrolysis/oxidation at temperatures achievable by existing thermal remediation techniques and in the presence of oxygen or soil mineral oxidants. The invention is particularly useful where applied to dissolved contaminant plumes.

SUMMARY OF THE INVENTION

It is an object of the present invention to perform in-situ destruction of contaminants.

A further object of the invention is to provide a thermal treatment wall for in-situ destruction of underground contaminants.

A further object of the invention is to provide thermal destruction of underground contaminants utilizing hydrous pyrolysis/oxidation in a soil heated by thermal remediation techniques.

Another object of the invention is to provide a thermal treatment wall emplaced to perform in-situ destruction of contaminants in groundwater.

An object of the invention is to provide a thermal treatment wall wherein thermal destruction of specific contaminants occurs by hydrous pyrolysis/oxidation at temperatures provided by electric heating or steam injection and in the presence of oxygen or soil mineral oxidants.

Other objects and advantages of the present invention will become apparent from the following description and accompanying drawings. Basically, the invention involves a thermal treatment wall for in-situ destruction of underground contaminants, and is particularly applicable for performing destruction of contaminants in groundwater. The thermal treatment wall incorporates heating of the ground zone either by electrical heating or steam injection, and the in-situ destruction of contaminants is accomplished by thermal hydrous pyrolysis/oxidation. The oxygen may be provided by oxygen in the groundwater, for example, or by soil mineral oxidants, e.g., $MnO_2$. Should supplemental oxygen or other constituents be required, the heating wells can be used to supply such. The thermal treatment wall can be installed in a variety of configurations depending on the specific objectives. The thermal treatment wall can be emplaced in a planar configuration so as to interdict a moving plume, or in a donut shape about an extraction well, for example. The invention can be utilized for a variety of subsurface contamination problems, and is particularly applicable for the removal groundwater contaminants, such as in underground water plumes. For example, operation in a single treatment water well involves: inject and cleans, and then extract clean ground water.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention involves in-situ destruction of underground contaminants, particularly contaminants in groundwater, by the use of a thermal treatment wall located, for example, in a water plume migration region, adjacent a plume core region with remediation in the plume core, around a water extraction well, or as a horizontal heating filter in a plume migration zone. The thermal treatment wall functions as a filter to remove contaminants from groundwater, for example. Thermal destruction of specific contaminants occurs by hydrous pyrolysis/oxidation at elevated temperatures of about 80° C. to 150° C., or greater, which are achievable by existing thermal remediation techniques (electric heating or steam injection) and in the presence of oxygen or soil mineral oxidants, such as $MnO_2$. The temperatures depend on the contaminate, typically 90° C. to 120° C. Thus, the thermal treatment wall can be used for both plume interdiction and near-wellhead in-situ groundwater treatment. Also, where needed additional oxygen, for example, can be injected into the thermal treatment zone via the heating wells. If needed, a plurality of thermal treatment walls can be located in a treatment zone.

A thermal treatment wall can be emplaced to perform in-situ destruction of contaminants in groundwater, for example. Thermal destruction of specific contaminants occurs by hydrous pyrolysis/oxidation at temperatures achievable by existing thermal remediation techniques (electric heating or steam injection) and in the presence of oxygen or soil mineral oxidants, such as $MnO_2$, $Fe_2O_3$, or $NaClO_4$. The thermal treatment wall can be installed in a variety of configuration depending on the specific objectives, with the following description and accompanying figures illustrating various configurations.

Figure 1:
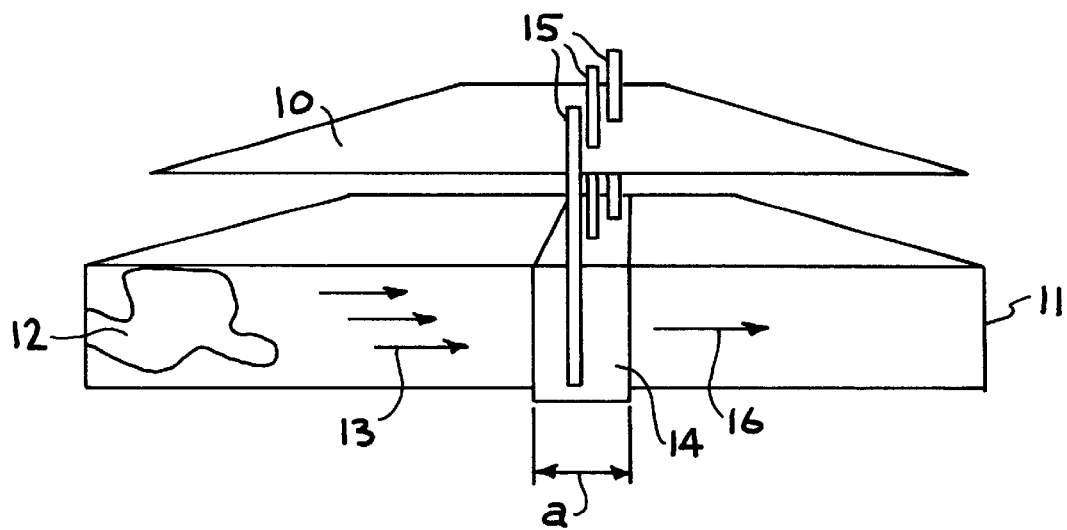
FIG. 1 illustrates the thermal treatment wall located in a contaminated groundwater plume migration region, and intercepts and cleans the contaminated water.

For a moving or migrating water plume, for example, a thermal treatment wall, such as shown in FIG. 1, can be emplaced in a planar configuration so as to interdict the migrating plume. As groundwater moves through the treatment wall, either passively by regional hydrologic gradients or in a more active fashion by intentional pumping, the contaminants are mineralized by hydrous pyrolysis/oxidation. The treatment wall design specifications depend on the residence time requirements for the contaminant(s) of concern given the appropriate reaction rates for thermal destruction and the constraints on achievable temperature and oxygen concentrations or abundance or soil mineral oxidants.

Figure 3:
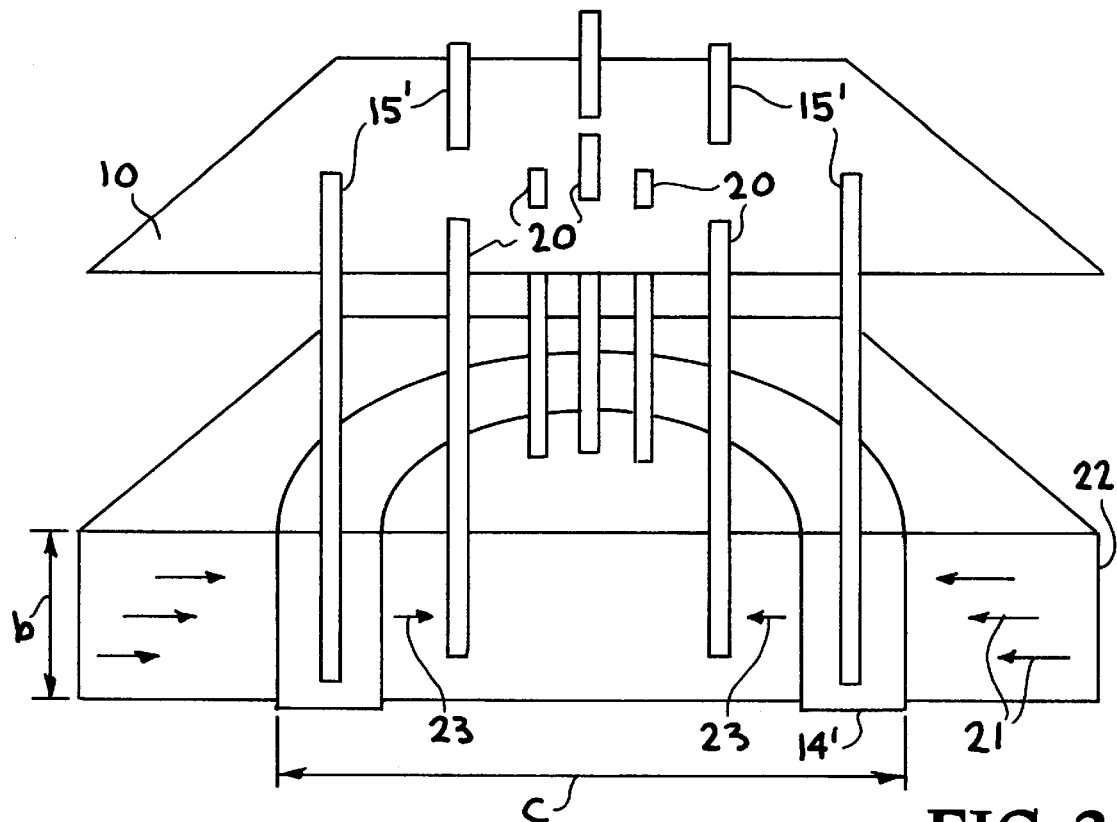
FIG. 3 illustrates the thermal treatment wall located in a water bearing region and surrounding a plurality of water extraction wells whereby the water is cleaned prior to reaching the extraction wells.

For application to cleaning of fluids to be removed by extraction to the surface, and as shown in FIG. 3, the thermal treatment wall can be emplaced in a zone surrounding the extraction well(s). The treatment wall could be installed in a donut shape in order to provide a reaction zone for thermal destruction of contaminated fluids as they flow through an aquifer to the extraction well(s). The reaction zone characteristics (thickness, temperature, etc.) is subject to the same design constraints as discussed above.

The thermal treatment zone, in which the treatment wall is located, is first established by heating the ground. Depending on the site characteristics (soil type, permeability, degree of heterogeneity, etc.) one heating technique may be favored over another. Steam injection is an efficient method for heating the ground. It has an additional advantage in that, should supplemental oxygen or other component(s) be required, the delivery system(s) are already in place. Electrical heating may be preferable in clay-rich, relatively low permeability soils. Should supplemental oxygen or other constituent(s) be required, the heating well(s) could be used for delivery, but flow and mixing paths may not necessarily be as well established. Once the treatment zone is established, the energy requirements to maintain the treatment wall decreases dramatically, as the ground itself loses heat very slowly; the primary heat loss in the system is that devoted to heating fluids as they pass through the treatment wall and are cleaned.

Figure 4:
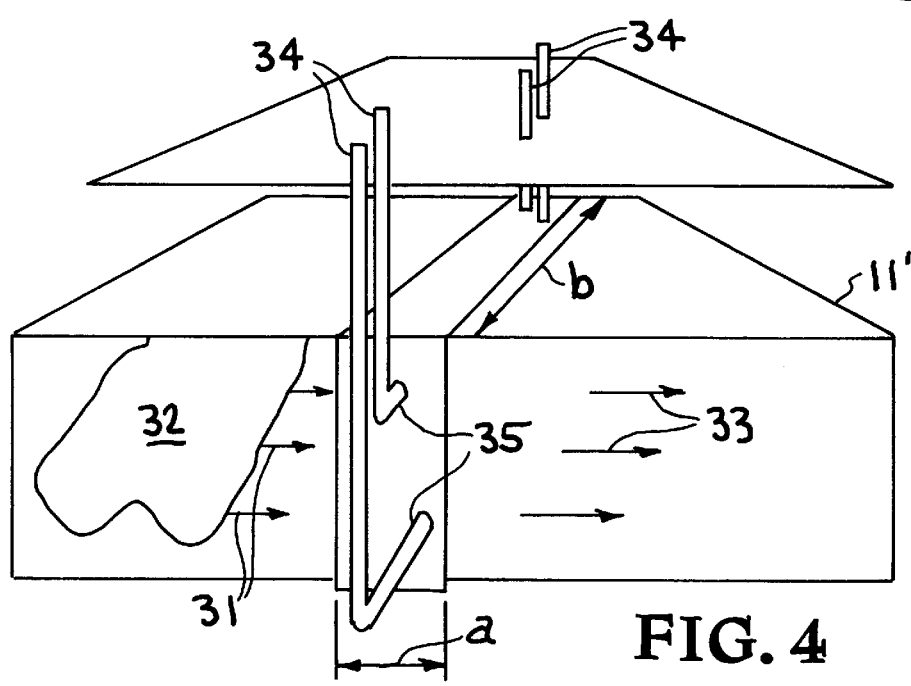
FIG. 4 illustrates the thermal treatment wall formed in a trench positioned in a contaminated groundwater plume migration zone, to provide horizontal heating wells in the aquifer via electrical or steam heating, and enables the injection of air or oxygen via the heating wells.

The treatment zone may be developed in native soil. In this application, the natural heterogeneities of the ground will provide constraints on treatment wall design and performance. However, a more controlled method would be to establish a treatment wall in which the material properties are controlled. In this instance, as shown in FIG. 4, a trenched zone or zones can be filled with material of known properties (i.e., gravel or sand containing soil mineral oxidants, such as $MnO_2$), to create an engineered treatment wall. Heating would be focused on this zone, in which the delivery and concentration of heat and supplemental constituents such as oxygen can be controlled. This approach may be a preferred application for shallow groundwater contamination.

Referring now to the drawings, FIG. 1 illustrates an embodiment of the thermal treatment wall or filter emplaced in a moving or migrating groundwater plume. Below the ground surface 10 is a treatment zone 11 within which is body or core region 12 of contaminated water having a moving or migration plume indicated by arrows 13. A thermal treatment wall generally indicated at 14 having width for example, of 50 feet as indicated at, a, and includes a plurality of heating wells 15, three shown, but may utilize one to any number of wells depending on the specific objective of an application. As the migration plume passed through the treatment wall 14, which is heated to a temperature of 100° C. to 150° C., for example, depending on depth, the water is cleaned as indicated by arrow 16 by the thermal treatment process (hydrous pyrolysis/oxidation) described above. The treatment wall 14 is heated to a temperature sufficient to mineralize contaminants in the water migration plume 13.

Figure 2:
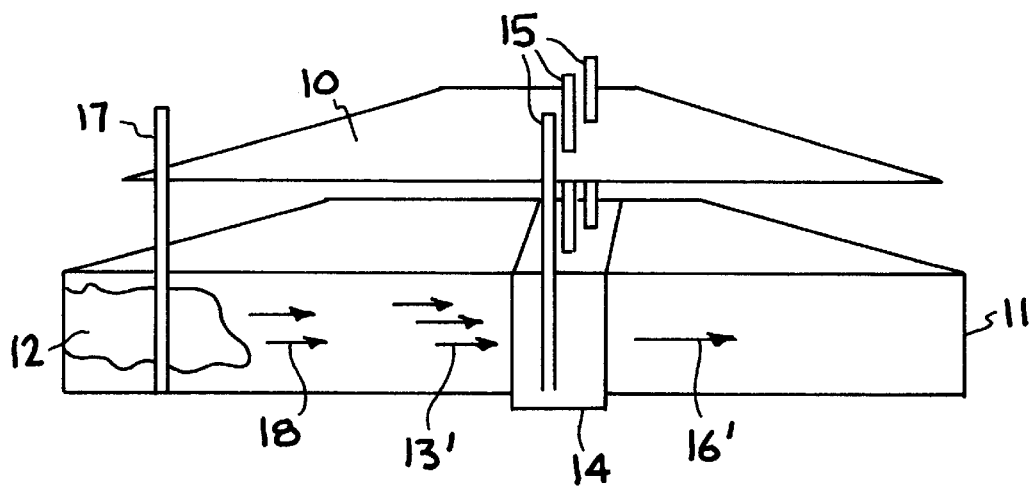
FIG. 2 is similar to FIG. 1, but additionally involves active remediation in the plume core region to displace contaminated water and clean the displaced water.

FIG. 2 is generally similar to FIG. 1 except there is no water migration plume, and similar reference numerals are utilized for similar components. In addition to the thermal treatment wall or filter 14, a heating or activation well 17 is positioned in the body or core region 12 of the contaminated water, whereby active remediation in the core region displaces contaminated water there from as indicated by arrows at 18 to form a migration plume, as indicated by arrows 13', which passes through the thermal treatment wall 14 and is cleaned as indicated by arrow 16. While only one heating or remediation well 17 is illustrated, additional wells may be utilized depending on the treatment zone size, characteristics, etc.

FIG. 3 illustrates a thermal treatment well or filter positioned around a plurality of water extraction wells to clean the water before it is extracted. Here the treatment well is of an annular or donut configuration having a diameter or 200 feet, for example. As shown, the thermal treatment well 14' having a plurality of heating wells 15' is positioned around a plurality of water or extraction wells 20, whereby contaminated groundwater indicated by arrows 21 from a water bearing region 22 is cleaned while passing through the treatment wall 14' as indicated by arrows 23. By way of example, the treatment wall has a depth of 65 feet as indicated at "b" and a diameter of 200 feet as indicated at "c".

FIG. 4 illustrates an embodiment of an engineered thermal treatment wall formed in a trench and incorporates horizontal heating wells to create a filter within an affected aquifer via electrical or steam heating. The heating wells may be used to inject additional air or oxygen. As shown, a thermal treatment wall or filter 30 is formed in a treatment zone 11' to intercept a plume migration indicated by arrows 31 of a body of contaminated groundwater 32, which passes through the treatment wall 30 and is cleaned thereby as indicated by arrows 33. The treatment wall 30 is formed to desired engineer specifications and may be formed by selected materials to produce the most effective cleaning or filtering of the contaminated groundwater. In this embodiment four (4) vertical heating wells 34 and two (2) horizontal heatings wells 35, which may be connected to vertical wells 34 are utilized. By way of example, the treatment wall 30 has a width or thickness of 50 feet as indicated at "a" a length of 250 feet as indicated at "b". For example, the engineered treatment wall 30 may be constructed of materials selected from the group of gravel, sand, or other soil depending on its location and specific application, and may be provided with a desired mineral oxidant, such as $MnO_2$, $NaClO_4$, $Fe_2O_3$, peroxide, other Mn or Fe oxide phases or mixed phases, or other oxidizing agents, and if needed additional air or oxygen can be supplied via the heating wells 34-35 as described above. Also, the horizontal well pipes 35 may include apertures through which selected material may be injected into the treatment wall.

Figure 5:
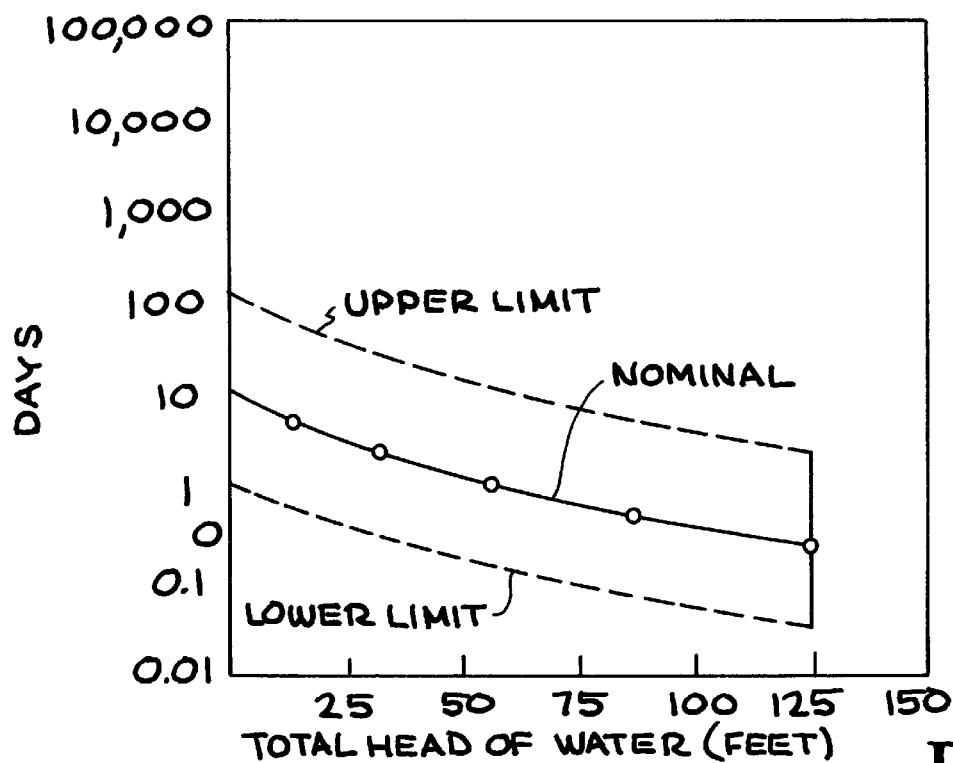
FIG. 5 graphically illustrates the depth/time/temperature issues for degrading saturated TCE as a function of depth.

FIG. 5 illustrates graphically the time required for saturated TCE destruction or degradation as a function of depth below the water table. Water containing TCE must remain at the boiling point for the number of days indicated. This sets the minimum width of the treatment zone. Temperatures less than boiling would increase required residence time by 2.2 for each 10° C. of decrease. Upper and lower limits illustrated in FIG. 5 encompass all the experimental error: nominal is best set to all experimental data.

Figure 6:
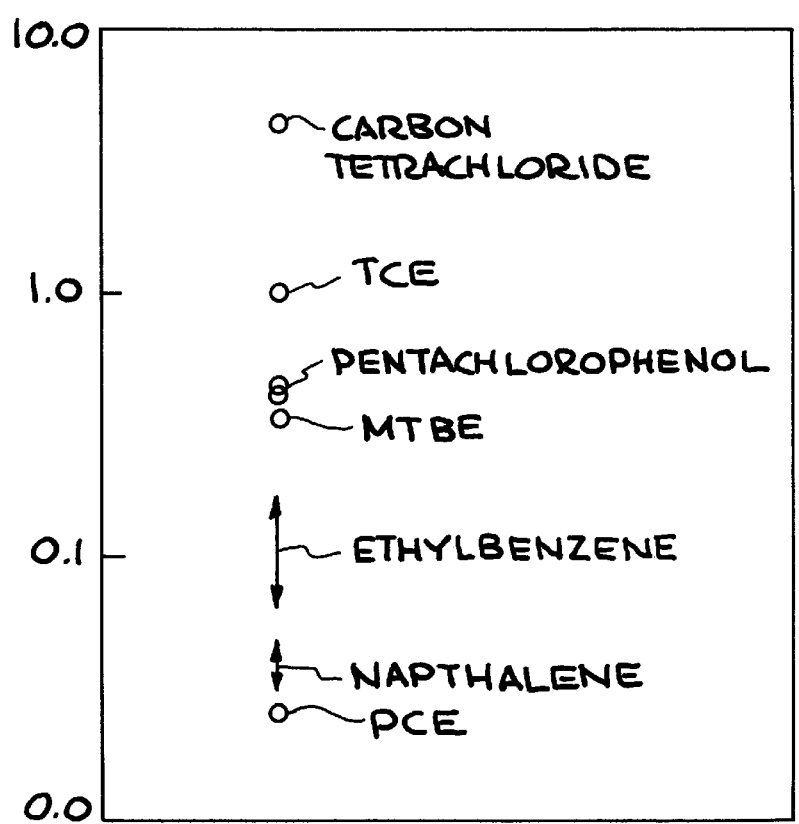
FIG. 6 provides the approximate scaling for various chemicals, illustrating that faster reaction times reduce the residence time (thickness of the treatment zone).

FIG. 6 illustrates relative rates of reaction chemicals tested for HPO reaction, with TCE set to 1 in the scale, for comparison to FIG. 5. Thus, the approximate scaling for other chemical (i.e., carbon tetrachloride reacts six times faster than TCE, and thus requires ⅙ the residence time (thickness of treatment zone).

It has thus been shown that the present invention provides a thermal treatment wall or filter which can be emplaced to perform in-situ destruction of underground contaminants, and is particularly applicable for the treatment of contaminated groundwater. The treatment wall of this invention can greatly reduce the cost and risks associated with groundwater cleanup, since it involves in-situ destruction of contaminants rather than extracting contaminated fluids to the surface, where the fluids are to be cleaned. The treatment wall can be located in any desired treatment zone, around extraction wells, or specifically engineered in a trench to intercept groundwall flow.

While particular embodiments, materials, parameters, etc., have been set forth to exemplify and teach the principles of the invention, such are not intended to be limiting. Modifications and changes may become apparent to those skilled in the art, and it is intended that the invention be limited only by the scope of the appended claims.

The invention claimed is:

1. A thermal treatment wall located in an underground flow path of contaminated water for performing in-situ destruction of underground water contaminants, including:

means for heating underground contaminants to enable in-situ destruction of contaminants passing from an underground water source through the treatment wall.

2. The thermal treatment wall of claim 1, wherein the thermal treatment wall for heating is selected from the group consisting of electrical heating and steam injection heating.

3. The thermal treatment wall of claim 1, wherein the in-situ destruction of contaminants is carried out by hydrous pyrolysis/oxidation.

4. The thermal treatment wall of claim 3, wherein the hydrous pyrolysis/oxidation is carried out in the presence of underground oxygen or soil mineral oxidants.

5. The thermal treatment wall of claim 4, wherein the soil mineral oxidants are selected from the group consisting of $MnO_2$, $Fe_2O_3$, $NaClO_4$, and Mn and Fe oxide phases and mixed phases.

6. The thermal treatment wall of claim 3, wherein hydrous pyrolysis/oxidation is carried out in a temperature in the range of about 90° C. to about 150° C.

7. The thermal treatment wall of claim 1, additionally including an active remediation well positioned adjacent said thermal treatment wall to cause flow of underground contaminants through the treatment wall.

8. The thermal treatment wall of claim 1, wherein said thermal treatment wall is constructed of a donut configuration.

9. The thermal treatment wall of claim 8, wherein said donut configured treatment wall extends around at least one extraction well.

10. The thermal treatment wall of claim 1, wherein said thermal treatment wall is constructed to intercept a groundwater plume migration.

11. The thermal treatment wall of claim 10, wherein said thermal treatment wall is constructed adjacent a surface of a treatment zone, and comprises a trench formed in the treatment zone and provided with selected fill material and heating means, whereby groundwater passing there through is cleaned.

12. The thermal treatment wall of claim 1, wherein said thermal treatment wall is constructed adjacent a core region of contaminated groundwater, and additionally including an active remediation means positioned in said core region to cause displacement of contaminated groundwater therefrom and flow toward said thermal treatment wall for cleaning the groundwater passing there through.

13. A method for in-situ cleaning of underground contaminated water, comprising:

providing at least one thermal treatment wall in a flow path of the contaminated water, providing heating means for the thermal treatment wall, and cleaning the contaminated underground water passing through the thermal treatment wall.

14. The method of claim 13, wherein providing the heating means for the thermal treatment wall is carried out using heating produced from the group consisting of electrical heating and steam injection heating.

15. The method of claim 13, wherein cleaning of contaminated water by the thermal treatment wall includes hydrous pyrolysis/oxidation.

16. The method of claim 13, additionally including heating the thermal treatment wall to a temperature in the range of about 90° C. to about 150° C.

17. The method of claim 13, additionally including forming the thermal treatment wall with a configuration selected from the group of straight, curved, and combination thereof.

18. The method of claim 17, wherein forming of the curved configuration produces an annular shape.

19. The method of claim 13, additionally providing a remediation means for directing contaminated water toward said thermal treatment wall.

20. The method of claim 13, additionally including forming the thermal treatment wall in a trench located in a treatment zone through which contaminated water passes.

21. The method of claim 13, additionally including constructing the thermal treatment wall to include an extraction well which additionally serves as a steam injection well, whereby clean water can be withdrawn after steam injection and cleaning of the water.

22. The method of claim 21, wherein the injection and extraction are periodically cycled.

* * * * *